Jan. 30, 1968  A. E. SNOWDON  3,366,878
COMBINED ADJUSTING KNOB AND INDICATING METER
Original Filed April 14, 1966
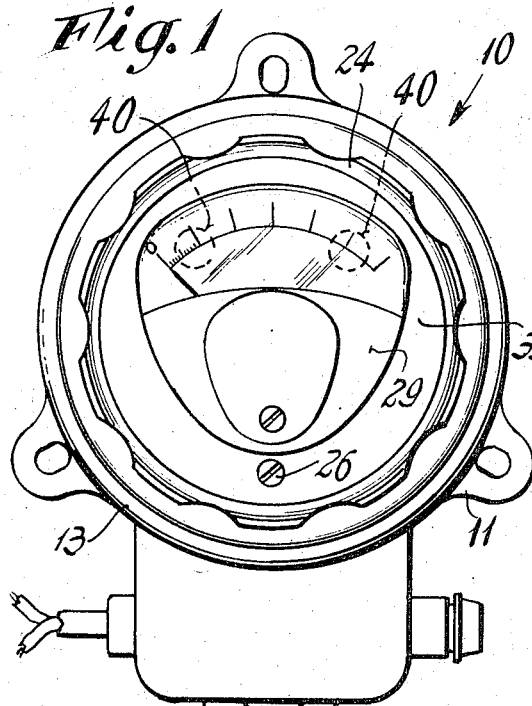
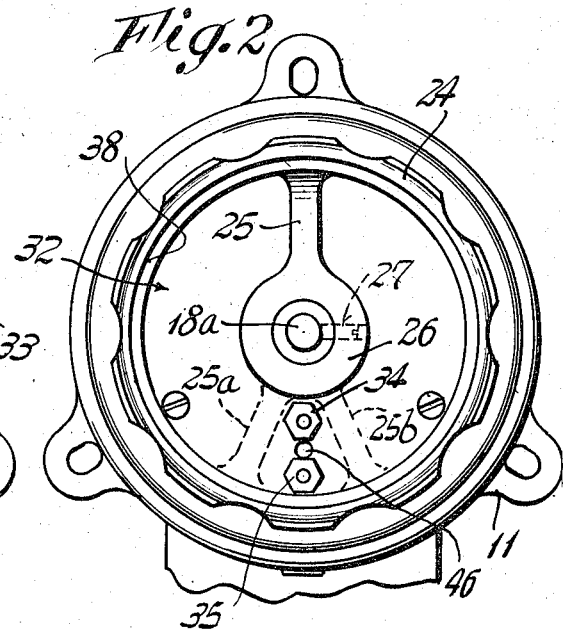
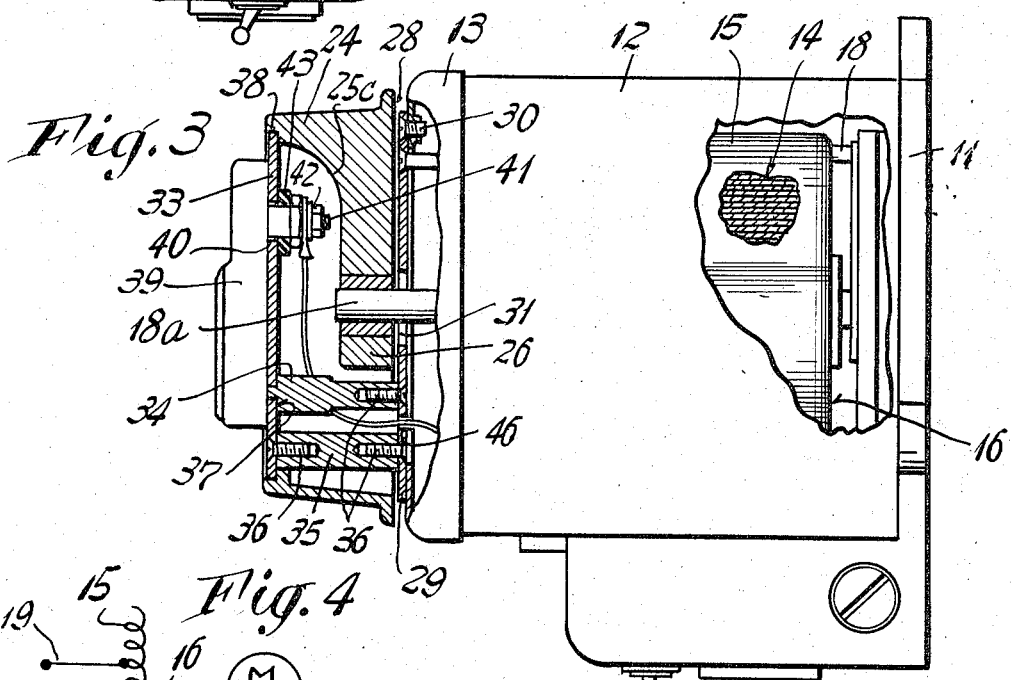
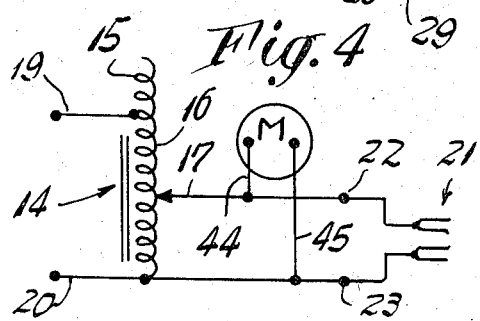
INVENTOR.
Arthur E. Snowdon
BY
Johnson and Kline
ATTORNEYS

United States Patent Office 3,366,878
Patented Jan. 30, 1968

3,366,878
COMBINED ADJUSTING KNOB AND
INDICATING METER
Arthur E. Snowdon, Bristol, Conn., assignor to The Superior Electric Company, Bristol, Conn., a corporation of Connecticut
Continuation of application Ser. No. 542,666, Apr. 14, 1966. This application June 9, 1967, Ser. No. 645,061
3 Claims. (Cl. 324—157)

This is a continuation of application Ser. No. 542,666, filed Apr. 14, 1966, and now abandoned.

The present invention relates to an adjusting knob for adjusting an electrical device for varying an electrical quantity and a meter incorporated with the knob to provide an indication of the value of the quantity.

An electrical device in which the present invention has particular utility is an adjustable voltage autotransformer. In U.S. patent application, Ser. No. 264,551, assigned to the same assignee as the present invention, there is disclosed an adjustable voltage autotransformer which has an electrical meter that is interconnected with the terminals of the autotransformer to provide an indication of an electrical quantity, such as current or voltage, that appears at the terminals. The meter is mounted on a knob which a user rotates to adjust the autotransformer. The autotransformer is mounted to have the knob readily accessible to the user and thus the meter is positioned to be conveniently readable by the user as the knob is manipulated. In such an autotransformer, the knob is arcuately movable and the meter is fixed to the knob to be movable therewith. While such an indicating autotransformer has achieved its desired purposes, it has not been found completely satisfactory in all instances by reason of the inconvenience and possiblity of error in reading the meter introduced by its different angular positions.

It is accordingly an object of the present invention to provide an adjustable voltage autotransformer having an electrical quantity indicating meter in which the meter is secured on the autotransformer and positioned to be conveniently readable but yet the meter is maintained at the same angular position for all adjustable positions of the autotransformer.

Another object of the present invention is to provide an indicating adjustable voltage autotransformer which achieves the above object even with the meter being mounted within the adjusting rotating member of the autotransformer and thus readily viewable by the user when adjusting the autotransformer.

A further object of the present invention is to achieve the above objects with an indicating autotransformer that is extremely simple in construction, economical to manufacture and easily incorporated in presently available autotransformers.

In carrying out the present invention there is provided an adjustable voltage autotransformer that has a shaft which when arcuately rotated, enables a user to adjust the value of the output voltage. The autotransformer includes a base on which a coil is fixed and the shaft is mounted for angular movement with respect thereto to move a brush on a commutating surface formed on the coil. The shaft projects from the coil and has secured thereon a knob by which a user may rotate the shaft to effect the adjusting.

The knob is annular and formed with front and rear openings and an inwardly extending arm with the arm being secured to the shaft. Positioned adjacent the rear opening is a backing plate that is secured to the base and a cover located within the front opening is supported by the backing plate. The cover has secured on its exterior an electrical meter so that the knob circumscribes the cover and meter and may be rotated while the meter, cover and backing plate are maintained stationary. The meter is interconnected with the output terminals of the autotransformer to indicate an electrical quantity thereat, such as the output voltage, and the interconnections consist of wires that pass through the backing plate to the output terminals.

Other features and advantages will hereinafter appear.

In the drawing:
FIGURE 1 is a plan of an adjustable voltage autotransformer in which the present invention is incorporated.
FIG. 2 is a view similar to FIG. 1 with the meter and cover removed.
FIG. 3 is a side view, partly in section and partly broken away, of the autotransformer.
FIG. 4 is an electrical schematic diagram of the electrical connections of the present invention.

Referring to the drawing, the adjustable voltage autotransformer of the present invention is generally indicated by the reference numeral 10 and is shown mounted within a frame that includes a base plate 11 by which the autotransformer may be vertically or otherwise supported together with a cylindrical cover 12 and a cap 13. Within the frame there is positioned an annular core 14 formed of a strip of paramagnetic material spirally wound and on which there is toroidally wound a winding 15 of electrical conducting wire. The winding has an end surface formed to provide a planar, arcuate commutating surface 16 and a brush 17 is movable thereon in slidable, electrical engagement therewith. The brush is mounted for rotational movement through an arc of perhaps 320° on a shaft 18 such that rotation of the shaft effects arcuate movement of the brush on the commutating surface and thus provides for the adjustment of the output voltage.

In the particular embodiment of the autotransformer shown, there are a pair of input leads 19 and 20 that are connectible to a source of alternating current and two spaced points on the winding. The output terminals of the autotransformer shown include a female prong-type socket indicated by the reference numeral 21 having internal connections 22 and 23 connected to the brush 17 and lead 20 respectively though, if desired, other types of terminals may be employed.

The shaft 18 has a portion 18a which projects through the cap 13 and on which is supported an annular knob 24. The knob 24 is preferably molded of plastic material or cast in metal to have peripheral fluted, finger engageable recesses and further includes an inwardly extending portion 25 that terminates in a hub 26 by which a set screw 27 or other securing means may be employed to secure the knob to the shaft portion 18a. It will be thus appreciated that rotation of the knob 24 rotates the shaft 18 and accordingly adjusts the position of the brush on the commutating surface.

Positioned adjacent a rear opening 28 of the knob is a backing plate 29 that is held as by screws 30 to the cap 13 of the frame though if desired it may be formed as an integral portion of the cap 13. The backing plate is formed with an aperture 31 through which the shaft portion 18a extends. The knob 24 further has a front opening 32 in which is held a flat cover 33. Preferably the opening 32 is circular and the cover is also circular to fit the opening. The cover 33 is secured to the backing plate 29 in spaced parallel relation, by a pair of posts 34 and 35 having appropriate screws 36 for securing the three parts together. The length of the post 35 and the length of the post 34 from the end of a flange 37 is dimensioned to space the cover from the backing plate a distance that causes the cover to fit within a circular lip 38 formed adjacent the front of the knob but yet to be sufficiently free from the lip to enable the knob to be arcuately moved without interference by the cover plate.

The cover 33 supports on its exterior surface a flush mounted meter 39 by being formed with a pair of apertures 40 in which threaded terminal posts 41 of the meter project. Nuts 42 are threaded on the parts to clamp the meter to the plate. Preferably the cover 33 is insulated from each post 41 by the employment of an electrically insulating washer 43.

The posts 41 constitute the electrical terminals of the meter and electrically connected thereto are conducting wires 44 and 45, there being one to each post with the lead 44 being connected to the terminal 22 and the lead 45 being connected to the terminal 23. The leads 44 and 45 extend through an aperture 46 formed in both the backing plate 29 and the cap 13 to be connected in the terminals.

In the operation of the autotransformer it will be understood that the user may adjust the output voltage of the autotransformer by angularly moving the knob 24 to an arc of perhaps 320° as is well known in the art. As the knob is rotated, the meter 39 is maintained stationary by being fixed to the cover 33 which in turn is supported on the frame by means of the posts 34 and 35, the backing plate 29 and the cap 13. Thus the meter maintains the same angular position which is preferably a normally vertical position of the indicia irrespective of the position of the knob.

It will be understood that the inwardly extending portion 25 has a thickness which enables it to assume the position 25a for one end of movement of the knob and the position 25b for the other end of movement without obstruction by the posts 34 and 35. Thus the posts 34 and 35 are located diametrically opposite the inwardly projecting portion 25 when the shaft is at its mid-point of movement. In addition, the knob has sufficient axial length so that it enables the meter and particularly the terminal posts 41 to be located sufficiently forward of the portion 25 to enable clearance to exist. Aiding in providing clearance is the reduced in thickness part indicated by the reference character 25c of the portion 25.

While the specific embodiment of the autotransformer hereinbefore disclosed is shown as having a frame that includes the cylindrical portion 12, it will be understood by those skilled in the art that when the autotransformer is panel mounted by abutment of the plate 11 against a panel that the backing plate 29 may be secured either to the panel or through the panel to the base plate 11.

The meter has been specifically disclosed as being interconnected to provide an indication of the value of the output voltage. The meter may be interconnected differently if a different quantity is desired to be measured such as amperage in the manner disclosed in the above-noted pending U.S. application.

It will accordingly be understood that there has been disclosed a knob for adjusting an electrical device by rotation of a shaft with an indicating meter for indicating the value of an electrical quantity that is adjusted by movement of the knob. The knob and meter are specifically disclosed incorporated in an adjustable voltage autotransformer with the meter indicating an electrical output quantity of the autotransformer. The knob is annular and circumscribes the meter thereby enabling the user when adjusting the autotransformer to have the meter placed in a position which renders it conveniently readable by a user during manipulation of the knob. Moreover, the meter according to the present invention, is maintained in the same angular position irrespective of the angular position of the knob and thus may be dependably read by a viewer.

Variations and modifications may be made within the scope of the claims and portions of the improvements may be used without others.

I claim:

1. In an indicating adjustable voltage autotransformer having a coil including a winding formed to have a commutating surface, a frame for supporting said coil, a shaft mounted for rotative movement in an arc less than a complete revolution with respect to said coil and carrying a brush adapted to arcuately move in slidable electrical engagement with said surface, and terminals connected to said winding and brush, the improvement comprising an annular knob concentric with and spaced from said shaft and having a narrow inwardly extending arm provided with means to receive said shaft, said knob having front and rear openings, a backing plate secured to the frame adjacent said rear opening and having an aperture through which said shaft projects so as to terminate within the confines of the knob, means securing the arm to the shaft whereby said shaft is arcuately movable by said knob, a cover positioned in the front opening, means including posts extending between and securing the cover to the backing plate in fixed spaced parallel relation, an electrical indicating meter fixed on said cover and electrical connections between said meter and the terminals, said posts being located in the space between the annular knob and shaft and being disposed diametrically opposite said narrow arm at the midpoint of the arc of movement of said knob whereby said knob may be rotated in either direction to move said brush to vary an electrical quantity at the terminals while said meter remains fixed to maintain its same angular position while indicating said electrical quantity.

2. The invention as defined in claim 1 in which the meter is of a size less than the cover and in which the knob is larger than the cover to enable a user to manipulate the periphery of the knob without interference by the meter.

3. The invention as defined in claim 1 in which the knob includes an annular recess and the edges of said cover are disposed within said recess.

References Cited

UNITED STATES PATENTS

| 688,614 | 12/1901 | Everest | 323—47 |
| 958,320 | 5/1910 | Roller. | |
| 1,593,626 | 7/1926 | Foote. | |
| 2,061,452 | 11/1936 | Comstock | 336—45 X |

RUDOLPH V. ROLINEC, *Primary Examiner.*